United States Patent
Maloney et al.

(10) Patent No.: US 7,072,647 B2
(45) Date of Patent: Jul. 4, 2006

(54) SYSTEM AND METHOD FOR PRE-PROGRAMMING A CELLULAR PHONE

(75) Inventors: John E. Maloney, San Diego, CA (US); Scott T. Swazey, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 304 days.

(21) Appl. No.: 09/755,312

(22) Filed: Dec. 19, 2000

(65) Prior Publication Data

US 2002/0077093 A1   Jun. 20, 2002

(51) Int. Cl.
*H04M 3/00* (2006.01)

(52) U.S. Cl. .......................... 455/418; 700/17; 712/29; 717/109

(58) Field of Classification Search ................ 455/418; 700/17; 712/29, 109; 717/109
See application file for complete search history.

(56) References Cited

U.S. PATENT DOCUMENTS

| | | | |
|---|---|---|---|
| 4,646,298 A | 2/1987 | Laws et al. .................... 371/16 |
| 5,068,783 A | 11/1991 | Tanagawa et al. .......... 395/575 |
| 5,517,656 A * | 5/1996 | Shi .............................. 712/29 |
| 5,819,025 A | 10/1998 | Williams ............... 395/183.06 |
| 6,282,699 B1 * | 8/2001 | Zhang et al. ............... 717/109 |
| 6,748,278 B1 * | 6/2004 | Maymudes .................. 700/17 |
| 2002/0077093 A1 * | 6/2002 | Maloney et al. ........... 455/418 |

FOREIGN PATENT DOCUMENTS

EP        0599488        10/1993

* cited by examiner

*Primary Examiner*—William D. Cumming
(74) *Attorney, Agent, or Firm*—Philip R. Wadsworth; Charles D. Brown; Kenyon Jenckes

(57) ABSTRACT

A system and method for parallel programming an electronic device's memory during manufacturing. In one embodiment, the electronic device is programmed in parallel with test code and a portion of the system code prior to board level testing. The test code is then used during board level testing of the electronic device. Once board level testing is complete, the electronic device is programmed with additional system code to complement the existing system code, whereby system level testing is then performed.

17 Claims, 2 Drawing Sheets

SYSTEM AND METHOD FOR PRE-PROGRAMMING A CELLULAR PHONE

BACKGROUND OF THE INVENTION

1. Field of the Invention

This invention generally relates to the manufacturing of electronic devices. More particularly, the invention provides a system and method for reducing costs associated with custom programming of electronic devices during manufacturing.

2. Description of the Related Art

Traditionally, electronic devices have been manufactured in a generic form. All consumers receive the same electronic device regardless of whether the device meets their exact needs. For example, early televisions required the consumer to manually program each channel they wanted to watch. Since over-air broadcast frequencies vary geographically, a manufacturer could not pre-program the television set without limiting the television's use to a specific geographic region. A consumer may have preferred having the television pre-programmed, but this would burden the manufacturer and increase the cost of the item. Equipping televisions with the ability to scan the entire bandwidth for viewable channels eventually solved this challenge for the consumer and manufacturer. However, as technology has advanced, consumers and technology have demanded even more customization from the manufacturer in their products.

More recently, the ubiquitous videocassette recorder ("VCR") entered the consumer marketplace to complement the existing television. This new device invariably included a remote control for remote operation of the VCR from anywhere in the consumer's family room. Almost immediately, the consumer demanded that they only wanted to use a single or unified remote control for both the television and VCR. Manufacturers responded with a consumer programmable remote control to complement the VCR. This convenience came at a price to the consumer, since enabling this feature required them to program their specific brand of television into the VCR, often by way of a three-digit code. However, technology today has far surpassed the VCR, and with this evolution, the ability for a consumer to program a product for his or her own needs has become prohibitively difficult.

Today, consumers must increasingly rely upon manufacturers who have the expertise to program modem consumer products as the amount of custom software required has trampled the simple three-digit code of the VCR. For example, cellular phones, which are becoming as common as VCRs, require customization for each end user. This customization includes not only information to identify the end user, but also includes their chosen mode of telecommunication technology, such as analog and/or digital. Hundreds of lines of code may be required to program a cellular phone for a specific user.

Because today's technology requires this level of programming, the manufacturer is required to incorporate this step into their manufacturing process and allocate additional space in the memory devices residing in the electronic device. Thus, to provide the consumer these choices, manufacturers spend a significant amount of time and resources programming such products for the consumer. This additional step, to customize each product for each user, increases the fabrication time and eventually is passed on to the consumer in the cost of the product. This need for additional customization may be dealt with by increasing the size of the memory allocated for such programming, but this solution also results in increased costs and reduced portability in the electronic device. None of these results are palatable to the consumer.

Thus, there is a need for a system and method for decreasing the process time in programming a consumer product while maintaining or increasing the level of customization required by today's consumer in our high-technology environment.

SUMMARY OF THE INVENTION

The systems and methods of the present invention have several features, no single one of which is solely responsible for its desirable attributes. Without limiting the scope of this invention as expressed by the claims which follow, its more prominent features will now be discussed briefly. After considering this discussion, and particularly after reading the section entitled "Detailed Description of the Invention" one will understand how the features of this invention provide several advantages over traditional programming of electronic devices.

One aspect of the present invention is a method of parallel programming an electronic device's memory with test code and system code prior to board level testing during manufacturing. The method comprises programming the electronic device with first instructions and second instructions, wherein the first instructions comprise the test code for use during board level testing and the second instructions comprise partial system code for system level testing. The method further comprises executing the first instructions during board level testing to determine the condition of the electronic device independent of the second instructions. Third instructions are then programmed into the electronic device, wherein the third instructions include system code to complement the second instructions. Finally, the second instructions and the third instructions are executed during system level testing of the electronic device.

Another aspect of the invention is a system for parallel programming an electronic device's memory with test code and system code prior to board level testing during manufacturing. The system comprises an electronic device, a programmable memory located in the electronic device, and a first input device in communication with the electronic device. First instructions and second instructions are programmed into the programmable memory by the input device wherein the first instructions comprise the test code and the second instructions comprise the partial system code. The system further comprises means for executing the first instructions stored in the electronic device. The system still further comprises a second input device in communication with the electronic device, wherein third instructions are programmed into the programmable memory to complement the second instructions to complete the system code. The system further comprises means for executing the second instructions and the third instructions stored in the electronic device during system level testing of the electronic device.

DETAILED DESCRIPTION OF THE INVENTION

The following detailed description is directed to certain specific embodiments of the invention. However, the invention can be embodied in a multitude of different ways as defined and covered by the claims. In this description, reference is made to the drawings wherein like parts are designated with like numerals throughout.

This invention minimizes the drawbacks associated with using multiple programming steps in the manufacturing process of an electronic device without having to limit the level or complexity of the device's final configuration to best suit the consumer's need. Typically, a manufacturer is limited in the level of complexity or customization they make available to a customer because of the increased manufacturing time associated with such customization. Often this time is needlessly spent updating a significant portion of the software included in the electronic device. Thus, pre-programming the electronic device's software code earlier in the manufacturing process to minimize any subsequent programming will increase manufacturing efficiency, as well as permit unrestrained customization for the consumer, while not increasing the cost of the electronic device.

Figure 1:
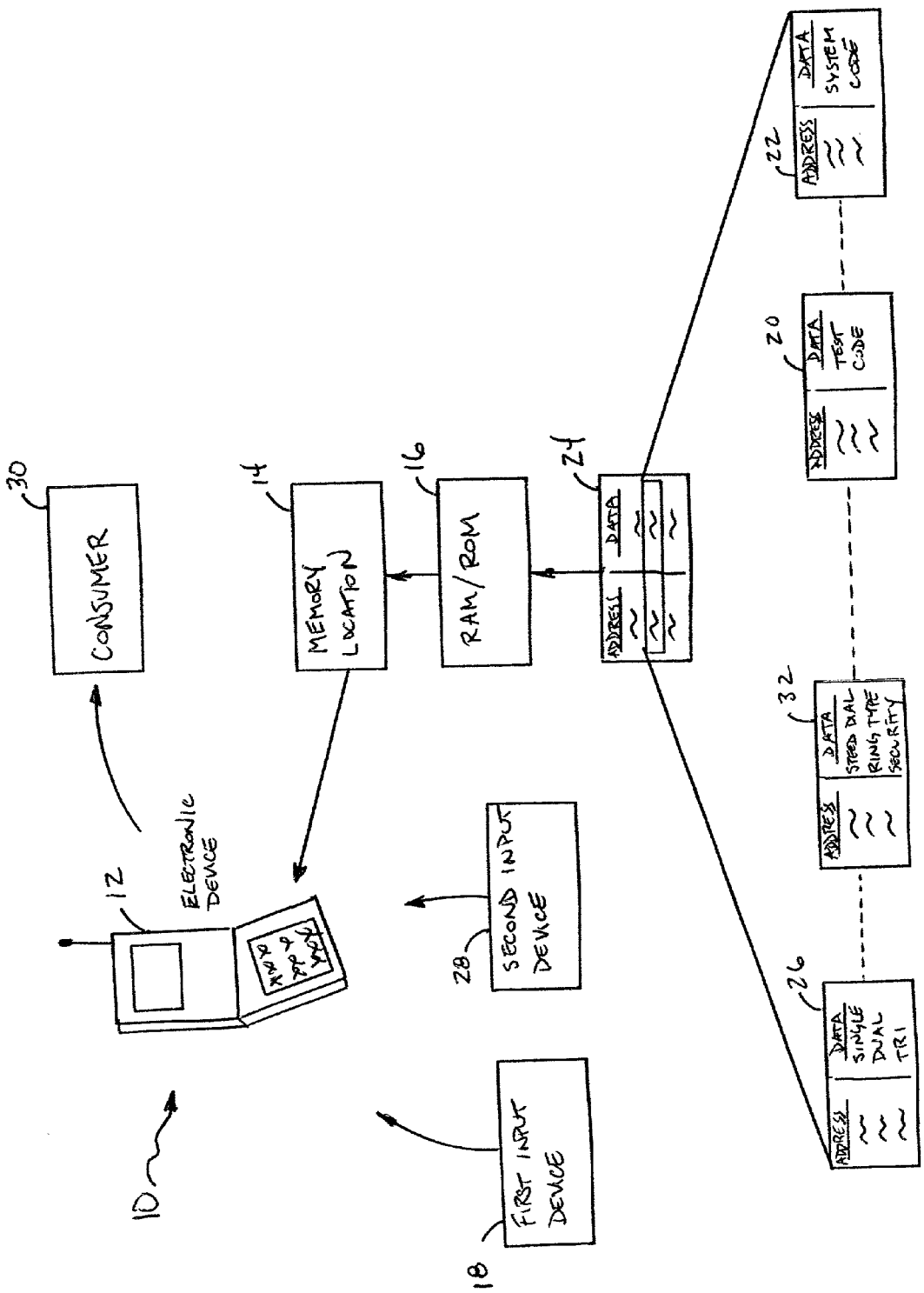
FIG. 1 is a block diagram illustrating a manufacturing system for the programming of an electronic device.

FIG. 1 is a representative diagram showing a manufacturing system 10 in accordance with the invention. An electronic device 12, such as, for example, a cellular phone or Personal Data Assistant (PDA) proceeds through the initial manufacturing process to a point where programming of an internal memory location 14 is required. Up until this point in the manufacturing process, the electronic device 12 may be fully configured and incorporate all of its component hardware. This hardware is preferably generic to the electronic device 12 and thus only software related changes are required in the manufacturing process prior to completion of the electronic device 12. In another embodiment, only a portion of the hardware is incorporated at this point in the manufacturing process with subsequent installations being performed.

The memory location 14 may be populated by read-only-memory ("ROM") and/or random-access-memory ("RAM") devices 16 depending on the design requirements. In many electronic devices 12, it is desirable to have the system level software stored in a ROM format because these types of programs are seldom changed. Many types of ROMs are known in the art, including, programmable read-only memory ("PROM"), erasable programmable read-only memory ("EPROM"), electrical read-only memory ("EEPROM"), and flash-EEPROM. The most common type of ROM is masked read-only memory, which is typically programmed by the manufacturer. This type of memory is not preferred since it does not permit subsequent re-programming of the memory location 14. PROM is similar to ROM except that the consumer typically does the programming, not the manufacturer. In an embodiment of the invention, ROM and PROM are jointly utilized, but the size of the overall memory location 14 must be increased if concurrent storage of the manufacturing and entire operational software is desired. EPROM does allow multiple programming of the memory device 16, but the manufacturer will incur significant process time during the erase procedure since it requires the application of an ultraviolet ("UV") light eraser to reach inside the memory device 16. EEPROM improves upon the EPROM by permitting its erasure with the use of electricity; no UV light source is required. A more recent type of ROM is called flash-ROM which further decreases the erasure time as this memory device 16 is erased completely since it lacks the circuitry of the EEPROM for allowing partial erasure of individual locations. Flash-ROM does allow information to be written to an erased location even though some other locations were already written to after the memory was completely erased. Therefore, EPROM, EEPROM, or flash-ROM are types of memory that can be used in device 16 with the benefit of being able to minimize the size of the memory location 14, since manufacturing and operational software can reside in series in the memory location 14.

RAM may also be used for the memory location 14 in the electronic device 12. RAM allows the memory device 16 to be written to and read from, and will maintain its contents until power is interrupted to the memory location 14. Often, a battery complements the use of static random-access memory ("SRAM") in an electrical device 12 to ensure that the SRAM maintains its contents even when the electrical device 12 is in an off mode, thereby overcoming the memory's inherent volatility. Dynamic random-access memory ("DRAM"), unlike SRAM, requires a smaller physical memory location 14 in the electronic device 12 and thus offers increased capacity over SRAM. However, DRAM requires its contents to be refreshed every few milliseconds. Any of these types of RAM memory devices 16 may be used in further embodiments of the invention depending on the manufacturer's design requirements. The prior descriptions are not intended to limit the types of memory devices 16 known in the art that could be used in the invention.

The electronic device 12 is in electrical communication with a first input device 18 for the uploading of test code 20 and system code 22 as bytes into multiple address and data locations 24 in the memory device 16. The memory location 14 is sized to accommodate both the test code 20 and system code 22 combined since both codes reside in the memory location 14 until called upon to execute their instructions. The memory location 14 may be partitioned to accommodate the test code 20 and system code 22 simultaneously. The first input device 18 programs the memory location 14 for board level testing of the electronic device 12 to ensure the component hardware is properly connected and its performance is nominal. In alternate embodiments, multiple similar or dissimilar memory devices, such as EEROM, flash-EEROM, and/or SRAM, may be used to permit parallel storage. In an alternative embodiment, only a portion of the system code 22 is stored in parallel with the test code 20, thus permitting a decrease in the size of the memory location 14. The portion of the system code 22 that is not uploaded in parallel with the test code 20 may be determined by evaluating, among many factors, the cost of the larger memory location 14 and the process time for a subsequent uploading of a portion of the system code 22. Another factor may be the manufacturer's desired flexibility during the manufacturing process of the electronic device 12. For example, if a portion of the system code 22 is continually revised during manufacture of the electronic device 12, that portion can be allocated to the subsequent uploading step to minimize its programming impact on the core portion of the system code 22.

In another embodiment, the portion of the system code 22 that pertains to a specific operational mode 26 of the electronic device 12 is uploaded by a second input device 28 after the initial test code 20 is executed. For example, if the electronic device 12 were a cellular phone, the system code 22 associated with the operational mode 26 of the cellular phone, such as dual, single, or tri-mode, may be uploaded later in the manufacturing process, thus increasing the manufacturer's flexibility in meeting consumer demand. In an alternate embodiment, the manufacturer could upload the operational mode code 26 before the initial test code 20 is executed. This would minimize programming of the cellular phone after a consumer 30 orders the electronic device 12. In still another embodiment, the first input device 18 is utilized instead of a second input device 28 for the second uploading of system code 22.

In one embodiment, the second input device 28 uploads to the memory location 14 preference information 32 unique to the consumer 30 purchasing the electronic device 12. Where the electronic device 12 is a cellular phone, this information may include identifying information such as the phone number, speed dial numbers, ring volume, and phone system features. This allows the consumer 30 to operate a new cellular phone without having to perform any significant programming. Default parameters can also be uploaded where the consumer 30 does not have preference information 32 concerning a feature.

The first and second input devices 18, 28 may be desktop, server, portable, handheld, set top, computer network, or any other desired configuration the first input device 18 may be used in conjunction with various operating systems such as UNIX, LINUX, DOS, OS/2, WINDOWS® 3.X, WINDOWS® 95, WINDOWS® 98, WINDOWS® NT, and WINDOWS® 2000 operating systems. A program for use with the input device 18 may be written in any programming language such as C, C++, BASIC, Pascal, Java™, and FORTRAN programming languages and run on well known operating systems. C, C++, BASIC, Pascal, Java™, and FORTRAN programming languages are industry standard programming languages for which many commercial compilers can be used to generate executable code.

The first and second input devices 18, 28 may use one or more microprocessors, such as a Pentium® processor, a Pentium® II processor, a Pentium® Pro processor, an xx86 processor, an 8051 processor, a MPS® processor, a Power PC® processor, or an ALPHA® processor. In addition, the microprocessor may be any conventional special purpose microprocessor such as a digital signal processor or a graphics processor.

Once board level testing is completed, the second input device 28 is used for the subsequent uploading of the portion of the system code 22 that was not initially loaded in parallel with the test code 20. The second input device 28 may be connected to the electronic device 12 using the same method as the first input device 18. In one embodiment of the invention, the first input device 18 is also utilized for the uploading of the second portion of the system code 22 in lieu of using the second input device 28.

Figure 2:
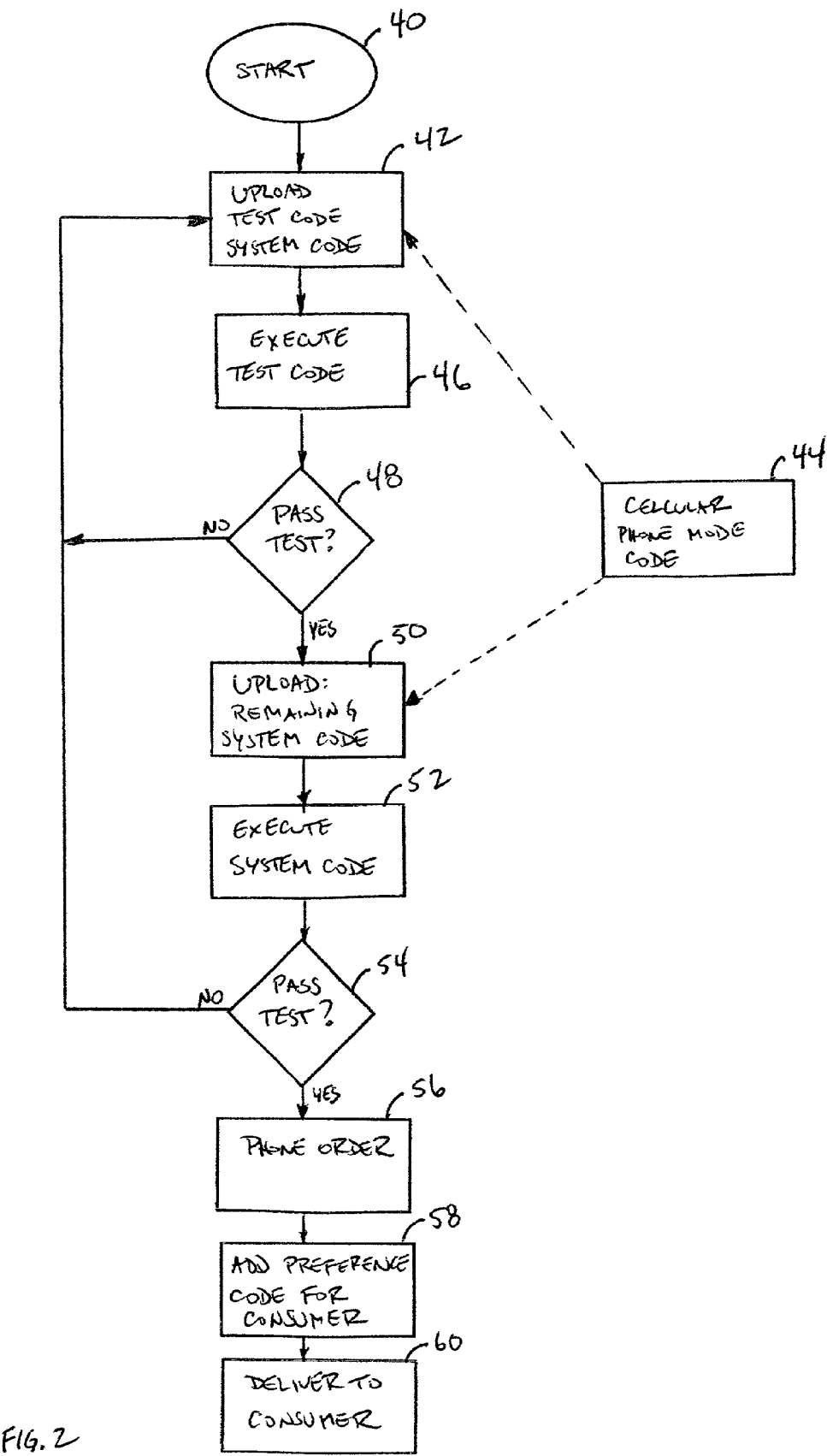
FIG. 2 is a flow chart illustrating one embodiment of a programming process that is performed by the manufacturing system shown in FIG. 1.

Operation of the manufacturing system 10 in accordance with one embodiment of the invention is described below with reference to FIG. 2. For convenience of description, the following text describes a manufacturing process with reference to the programming requirements of a cellular phone. However, the manufacturing process can be used whenever a manufacturer is required to install software in a consumer device.

In particular, flow begins in start block 40. Flow proceeds to block 42 where the test code 20 and system code 22 are uploaded into the electronic device's memory location 14. This first upload may include only the common system code 22, but will preferentially include all of the test code 20 for the electronic device 12 to support the subsequent board level testing. Furthermore, in the case of a cellular phone, this initial upload may include the common system code 22 as well as the designated operational mode code 26 as shown in block 44. Loading the operational mode code 26 prior to the consumer 30 ordering the cellular phone does limit the manufacturer's flexibility, but this disadvantage may be outweighed by a reduction in programming time after the product is ordered by the consumer 30. Flow continues to block 46 where the test code 20 is executed to determine the functionality of the individual components of the electronic device 12. If the electronic device 12 does not pass the board level testing at a decision state 48, the manufacturing system 10 returns to block 42, and proceeds as discussed above. If the electronic device 12 passes the board level testing at decision block 48, the manufacturing system 10 continues to block 50.

Next, at block 50, additional system code 22 is uploaded into the memory location 14 in preparation for system level testing. By already uploading some of the system code 22 in block 42, as discussed above, the upload process time in block 50 is reduced. The amount of system code 22 uploaded at block 50 may depend on the size of the memory location 14 since a larger size would be required to accommodate the entire system code 22 as well as the test code 20 simultaneously. Another factor will be the amount of system code 22 already installed in the memory location 14 at block 42, as discussed above. Furthermore, the selection of memory device 16 will also impact the amount of system code 22 that is initially loaded at block 42. To minimize the size of the memory location 14, the portion of system code 22 loaded at block 50 may overwrite the test code 20 already stored in the memory location 14. This system code 22 may consist of unique code for the electronic device 12 in contrast with the common code uploaded in block 42 above. Thus, this upload preferentially consists of the remaining system code 22 that was not uploaded in block 42.

In one embodiment of the invention, the designated operational mode code 26 is loaded as part of the second upload in block 44. For example, the operational mode code 26 would specify whether the cellular phone would operate in a single, dual, or tri-mode. In another embodiment, the system code uploaded at block 50 includes the user interface code. Continuing to block 52, the system code 22 is executed to determine the functionality of the electronic device 12. At a decision block 54, if the electronic device 12 does not pass the system level testing, the manufacturing system 10 returns to block 42, and proceeds as discussed above. By loading the test code 20 in parallel with some system code 22 at block 42 rather than only loading rest code 20, only the remaining portion of the system code 22 is uploaded after testing. Also, by overwriting the executed test code 20 with system code 22 at block 50, the size of the memory location 14 can be minimized to reduce cost. Furthermore, the subsequent system code 22 upload process time is reduced. This advantage is further magnified where the electronic device 12 fails testing and returns to block 42 since the electronic device 12 will proceed through the manufacturing process more than once. Otherwise, if the electronic device 12 passes the system level testing, the manufacturing system 10 continues to block 56.

Moving to block 56, the manufacturing system 10 receives an electronic device 12 order from a consumer 30. This order may include preferences from the consumer 30 in the form of speed dial numbers, phone number, and security settings. The manufacturer may upload these preferences 32 at a block 58 into the memory location 14. In one embodiment, these preferences 32 will overwrite some of the unnecessary test code 20 residing in the memory location 14. Finally, in block 60, the electronic device is provided to the consumer 30.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A method of programming an electronic device's memory with test code and system code, the method comprising the steps of:
    programming said electronic device memory with code common to a plurality of electronic devices, wherein a first portion of the common code comprises test code for use during board level testing of said electronic device, and wherein a second portion of the common code comprises partial system code for system level testing of said electronic device;
    executing said test code portion of the common code during board level testing of said electronic device to determine the condition of said electronic device;
    programming said electronic device memory with a third portion of code if the electronic device passes board level testing, wherein said third portion of code includes system code to complement said second portion of common code and customize said electronic device; and
    executing said second and said third portions of code during system level testing of said electronic device.

2. The method of claim 1, wherein said memory is flash memory.

3. The method of claim 1, wherein said step of programming said electronic device with said third portion of code comprises overwriting said first portion of code with said third portion of code.

4. The method of claim 1, wherein said third portion of code comprises user interface codes.

5. A system for programming an electronic device's memory with test code and system code, the system comprising:
    means for programming said electronic device memory with code common to a plurality of electronic devices, wherein a first portion of the common code comprises test code for use during board level testing of said electronic device, and wherein a second portion of the common code comprises partial system code for system level testing of said electronic device;
    means for executing said test code portion of the common code during board level testing of said electronic device to determine the condition of said electronic device;
    means for programming said electronic device with a third portion of code, wherein said third portion of code includes system code which complements said second portion of code to complete said system code and customize said electronic device, if the electronic device passes board level testing; and
    means for executing said second and said third portions of code during system level testing of said electronic device.

6. A system for programming an electronic device's memory with test code and system code, the system comprising:
    an electronic device;
    a programmable memory located in said electronic device, the programmable memory having an input for receiving code, wherein the programmable memory is programmed with code common to a plurality of portable electronic devices,
    wherein a first portion of common code comprises test code, a second portion of common code comprises partial system code for system level testing of said electronic device;
    means for executing said test code portion of the common code stored in said electronic device during board level testing of said electronic device to determine the condition of said electronic device;
    means for programming said programmable memory with a third portion of code, wherein the third portion of code includes system code to complement said second portion of common code and customize said electronic device;
    means for executing said second and said third portions of code stored in said electronic device during system level testing of said electronic device.

7. The system of claim 6, further comprising a first input devices for programming said first instructions, said second instructions, and said third instructions into said programmable memory.

8. The system of claim 6, wherein said programmable memory is flash RAM.

9. The system of claim 6, wherein said third portion of code comprises user interface codes.

10. The system of claim 6, wherein said programmable memory is flash memory.

11. The method of claim 1 further comprising:
    programming said memory with consumer preference information to customize the electronic device for an individual consumer, if the electronic device passes system level testing.

12. The method of claim 11 wherein the consumer preference information customized to an individual consumer includes at least one of a phone number, a speed dial number, or a ring volume setting.

13. The method of claim 1 wherein during the step of programming said electronic device memory with the third portion of code, said test code portion is overwritten.

14. The method of claim 13 wherein the third portion of code includes operational mode code.

15. The method of claim 14 wherein the operational mode code defines whether the device has dual, single, or tri-mode phone capability.

16. The method of claim 1 wherein the electronic device is a cellular phone or a personal digital assistant.

17. The system of claim 6 further comprising:
    a first input device for programming said first instructions and said second instructions into said programmable memory; and
    a second input device for programming said third instructions into said programmable memory.

* * * * *